US011290293B2

(12) United States Patent
Bhattacharyya et al.

(10) Patent No.: US 11,290,293 B2
(45) Date of Patent: Mar. 29, 2022

(54) CONFERENCE MANAGER (CM) FOR LOW BANDWIDTH VIDEO CONFERENCING

(71) Applicant: Tata Consultancy Services Limited, Mumbai (IN)

(72) Inventors: Abhijan Bhattacharyya, Kolkata (IN); Suvrat Agrawal, Bangaluru (IN); Hemant Kumar Rath, Bhubaneswar (IN); Arpan Pal, Kolkata (IN)

(73) Assignee: Tata Consultancy Limited Services, Mumbai (IN)

( * ) Notice: Subject to any disclaimer, the term of this patent is extended or adjusted under 35 U.S.C. 154(b) by 0 days.

(21) Appl. No.: 16/752,472

(22) Filed: Jan. 24, 2020

(65) Prior Publication Data

US 2020/0267010 A1  Aug. 20, 2020

(30) Foreign Application Priority Data

Jan. 25, 2019 (IN) .............................. 201921003235

(51) Int. Cl.
*H04L 12/18* (2006.01)
*H04M 3/56* (2006.01)
*H04L 47/36* (2022.01)

(52) U.S. Cl.
CPC ...... *H04L 12/1827* (2013.01); *H04L 12/1831* (2013.01); *H04L 47/36* (2013.01); *H04M 3/567* (2013.01)

(58) Field of Classification Search
CPC . H04L 12/1827; H04L 12/1831; H04L 47/36; H04M 3/567
See application file for complete search history.

(56) References Cited

U.S. PATENT DOCUMENTS

| 7,184,602 | B2 | 2/2007 | Cohen et al. | |
|---|---|---|---|---|
| 10,862,940 | B1* | 12/2020 | Jones | H04L 65/605 |
| 2002/0186243 | A1 | 12/2002 | Ellis et al. | |
| 2012/0260122 | A1* | 10/2012 | Puri | H04L 12/1822 714/3 |
| 2013/0326013 | A1* | 12/2013 | Khalife | H04L 45/124 709/217 |
| 2013/0335506 | A1* | 12/2013 | Carter | H04L 12/1827 348/14.07 |

* cited by examiner

*Primary Examiner* — Gil H. Lee
(74) *Attorney, Agent, or Firm* — Finnegan, Henderson, Farabow, Garrett & Dunner, L.L.P.

(57) ABSTRACT

Video conferencing involves transmission of video as well as audio over a network between people involved in the video conferencing, over a network. Typically, quality of conference sessions are affected by quality of network connection. If the bandwidth of the network is low, that that may cause call quality issues or call drops, which is not desirable especially in certain applications such as a surgery over video conferencing. Disclosed herein is a Conference Manager (CM) that can facilitate video conferencing over a low bandwidth network. The CM uses a producer unit and a consumer unit, for video capture and transmission, and a communication device for audio capture and transmission. The CM captures and combines audio and video data at a receiving end of the communication network. The CM also uses a fast block-wise data transfer mechanism for facilitating communication between the transmitting end and the receiving end.

2 Claims, 11 Drawing Sheets

CONFERENCE MANAGER (CM) FOR LOW BANDWIDTH VIDEO CONFERENCING

PRIORITY CLAIM

This U.S. patent application claims priority under 35 U.S.C. § 119 to: India Application No. 201921003235, filed on 25 Jan. 2019. The entire contents of the aforementioned application are incorporated herein by reference.

TECHNICAL FIELD

This disclosure relates generally to telecommunication networks, and more particularly to a Conference Manager (CM) for low bandwidth video conference in the telecommunication network.

BACKGROUND

Video conferencing allows two or more parties in different locations to interact with each other by seeing each other, and finds its application in use case scenarios such as personal communication, remote monitoring, tele-medicine and so on. Coverage/signal strength of the telecommunication networks is different in different places. For example, in a city the coverage is usually good and bandwidth and internet speed is also high, whereas in a rural area the coverage and the bandwidth may not be good. During the video conferencing between two parties, if the coverage and bandwidth is not good at location of even one party, it affects quality of the video conferencing session, and may even result in session getting terminated and packet loss.

While the packet loss and/or the session termination may not be critical if the video conferencing is between two friends, it would be very critical in some other applications. For example, consider tele-medicine domain. In the tele-medicine domain, doctors who are sitting at a remote location can inspect a patient and can suggest medicines. An even more critical application in the tele-medicine domain is remote robot-assisted surgery through video conferencing. In this scenario, the doctor who is at a remote location performs the surgery on a patient using robotic assistance. This requires continuous, uninterrupted, and real-time feed to the doctor from the patient's location, and any network that affects speed/bandwidth may be fatal for the patient.

The inventors here have recognized several technical problems with such conventional systems, as explained below. One of the existing mechanisms identifies characteristics that are critical for rendering the media by processing one or more media to be streamed, and then identifies corresponding segments of the media. Further the identified segments are transmitted to destination as reliable requests with guaranteed delivery, and the not so critical segments are transmitted as unreliable requests.

SUMMARY

Embodiments of the present disclosure present technological improvements as solutions to one or more of the above-mentioned technical problems recognized by the inventors in conventional systems. For example, in one embodiment, a Conference Manager (CM), is provided. The CM includes a producer unit, a consumer unit, and a data streaming unit. The CM is configured to handle bi-directional communication between a transmitting end and a receiving end of a communication network the CM is associated with. During this process, at the transmitting end of the communication network, the CM initiates a communication device and a visual sensor at the transmitting end when a conference session is initiated, using the producer unit, and then initiates capturing of an audio signal and a video, using the communication device and the visual sensor. At the receiving end of the communication network, the CM initiates reception of the audio signal and the video from the transmitting end, during the conference session, using the consumer unit. The CM also enables fast block-wise transfer of data, other than the audio signal or the video but related to the conference session, transmitted between the transmitting end and the receiving end to reduce latency if size of the data exceeds a Maximum Transfer Unit (MTU) size of the communication network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
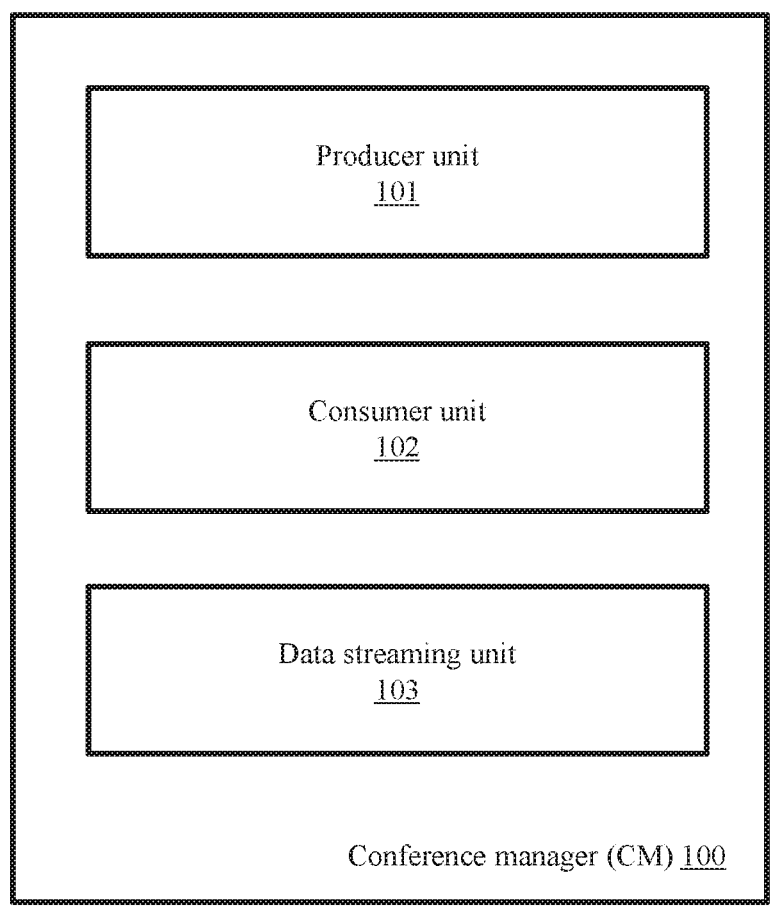
FIG. 1 illustrates an exemplary diagram of the Conference Manager (CM) for low bandwidth video conferencing, in accordance with some embodiments of the present disclosure.

FIG. 1 illustrates an exemplary diagram of the Conference Manager (CM) for low bandwidth video conferencing, in accordance with some embodiments of the present disclosure. The CM 100 includes a producer unit 101, a consumer unit 102, and a data streaming unit 103.

The producer unit 101 and the consumer unit 102 described herein are the video producer and the video consumer respectively, disclosed in Indian patent application number 201821005659 (title: ADAPTIVE RESTful REAL-TIME LIVE MEDIA STREAMING). In order to understand working of the producer unit 101 and the consumer unit 102, the entire contents of the patent application number 201821005659 incorporated here by reference.

The CM 100 is configured to host the producer unit 101 and the consumer unit 102, along with other components, and control and synchronize working of the producer unit 101 and the consumer unit 102 at a transmitting end and a receiving end of a communication network during a conference session, in order to facilitate the video conferencing in a low bandwidth network. In a conference system, the CM 100 is hosted at the receiving end as well as at the transmitting end.

Figure 3A:
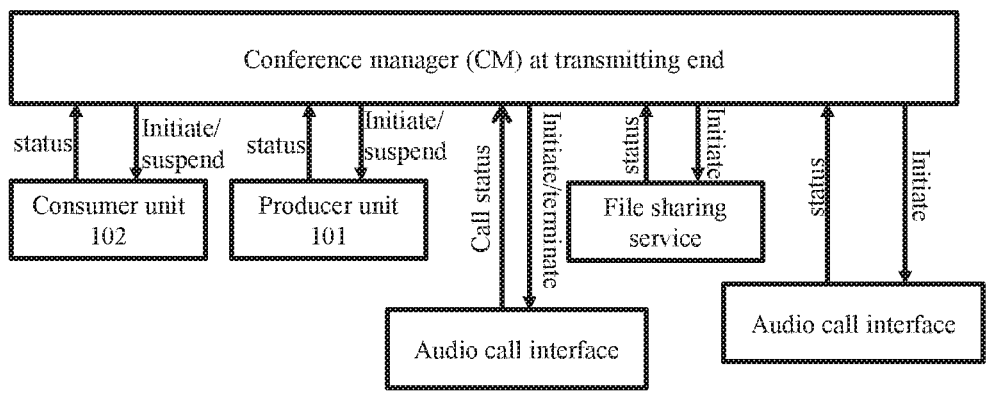
FIGS. 3A and 3B (collectively referred to as FIG. 3) illustrate communication between the CM of FIG. 1 and different components of the conferencing system, at a transmitting end and at a receiving end respectively of a communication network, in accordance with some embodiments of the present disclosure.

The CM 100 at the transmitting end is configured to initiate the conference session by calling the receiving end. If the call is answered by the receiving end, then the CM initiates the producer unit 101 and the consumer unit 102 at the transmitting unit 101, for the purpose of video transmission and video reception respectively. The CM 100 checks whether connection between the producer unit 101 at the transmitting end and the consumer unit 102 at the receiving end is successful or not. If the connection is successful, then the video transmission is performed between the producer unit 101 at the transmitting end and the consumer unit 102 at the receiving end. If the connection is unsuccessful, then the CM facilitates only audio communication between the transmitting end and the receiving end, using an associated (audio) communication device, which may be a mobile phone with at least second generation (2G) connectivity. If any additional data such as sensor data, documents and so on are to be transmitted, then appropriate input means at the transmitting end can be used by the CM 100 to collect the data. For example, if the CM 100 is deployed for a telemedicine application in which a doctor examines a patient from a remote location, the doctor would require details regarding certain physiological parameters such as blood sugar level, blood pressure level, heart beat count and so on, in addition to the video and/or audio data, for inspection and diagnosis purpose. In that scenario, appropriate sensors can be used for collecting information on various physiological parameters being monitored, and the corresponding data is taken as input by the CM 100 to transmit it to the receiving end. Similarly, if any document (in any specific format) is to be sent to the receiving end, the same can be collected and transmitted by the CM 100. Various data flow between the CM 100 and other components at the transmitting end, are depicted in FIG. 3A.

In an embodiment, the CM 100 at the transmitting end transmits the audio signal over a Public Switching Telephone Network (PSTN), and the video/sensor data/documents are transmitted over internet connection which may be of low bandwidth i.e. the CM 100 uses a combination of circuit switched and packet switched networks for the purpose of transmitting the data during the conference session.

The CM 100 at the receiving end of the communication network receives the call from the CM 100 at the transmitting end. If the call connection is successfully established, the CM 100 at the receiving end initializes the producer unit 101 and the consumer unit 102 at the receiving end. The producer unit 101 and the consumer unit 102 at the receiving end and the producer unit 101 and the consumer unit 102 at the transmitting end are to be connected to each other for the purpose of the audio/video/sensor data transfer. If the producer unit 101 and the consumer unit 102 at the receiving end and the producer unit 101 and the consumer unit 102 at the transmitting end are not connected, then the CM 100 allows only the audio communication to take place between the transmitting end and the receiving end.

Figure 3B:
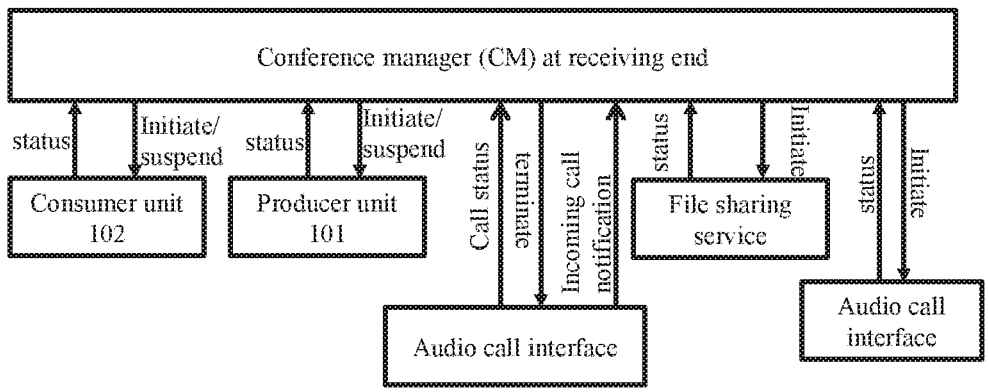
Figure 7:
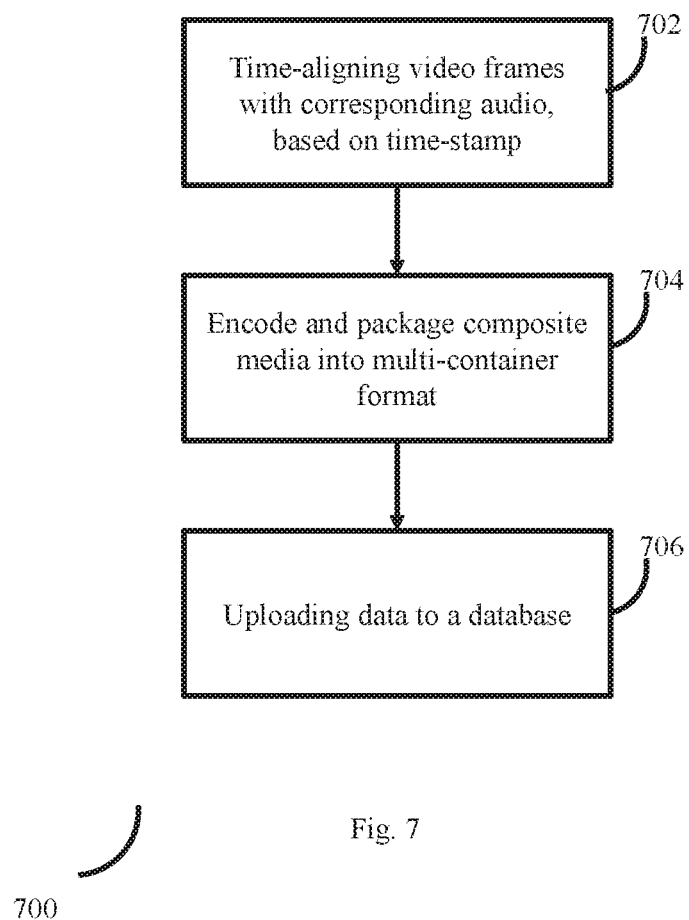
FIG. 7 is a flow diagram depicting steps involved in data packaging by the CM of FIG. 1, in accordance with some embodiments of the present disclosure.

At the receiving end, the CM 100 uses a media mixing unit 204 so as to mix the audio, video, and sensor data being received from the transmitting unit 101. One or more suitable mixing circuits may form the mixing unit 204. During the mixing of the audio, video, and other signals, the media mixing unit 204 time-aligns the video data with the corresponding audio data, and then encodes and packages the composite media into a multi-container format, and this data may be uploaded to any associated storage unit (local/remote/cloud). This mechanism is depicted in FIG. 7. The audio signal received from the mobile network and the video/sensor/documents received over the internet are fed as inputs to the mixing unit 204, and output of the mixing unit can be further displayed to one or more person at the receiving end, using one or more appropriate interfaces. Various data flow between the CM 100 and other components at the receiving end, are depicted in FIG. 3B.

The CM 100 is further configured to enable and facilitate a fast block-wise transfer of data between the transmitting end and the receiving end during the conference session. In an embodiment, the CM 100 enables the fast block-wise data (FBD) transfer if size of the data to be exchanged between the transmitting end and the receiving end exceeds a threshold of data size set in terms of a Maximum Transfer Unit (MTU) for the communication network. The steps in the FBD transfer are explained below:

During the FBD transfer, from the transmitting end of the communication network, all blocks except last block in a message frame corresponding to data being transmitted are sent as non-confirmable requests with a no-response option on a representational state transfer protocol (STP) over a datagram Transport protocol (DTP). The last block in the message frame corresponding to data being transmitted is sent as a confirmable request without the no-response option. Upon receiving the last block (without the no-response option), the receiving end transmits a response message back to the transmitting end. If the response message indicates loss of at least one of the blocks transmitted, the transmitting end identifies position of the at least one block in the message frame and retransmits the at least one block. The data transfer is terminated if the response message indicates that all blocks have been received. Here, since the response message is sent by the receiving end only after receiving the last block (and not separately for each of the blocks received), amount of load on the network is less. More details pertaining to the FBD transfer is provided with description of FIG. 6.

Figure 2:
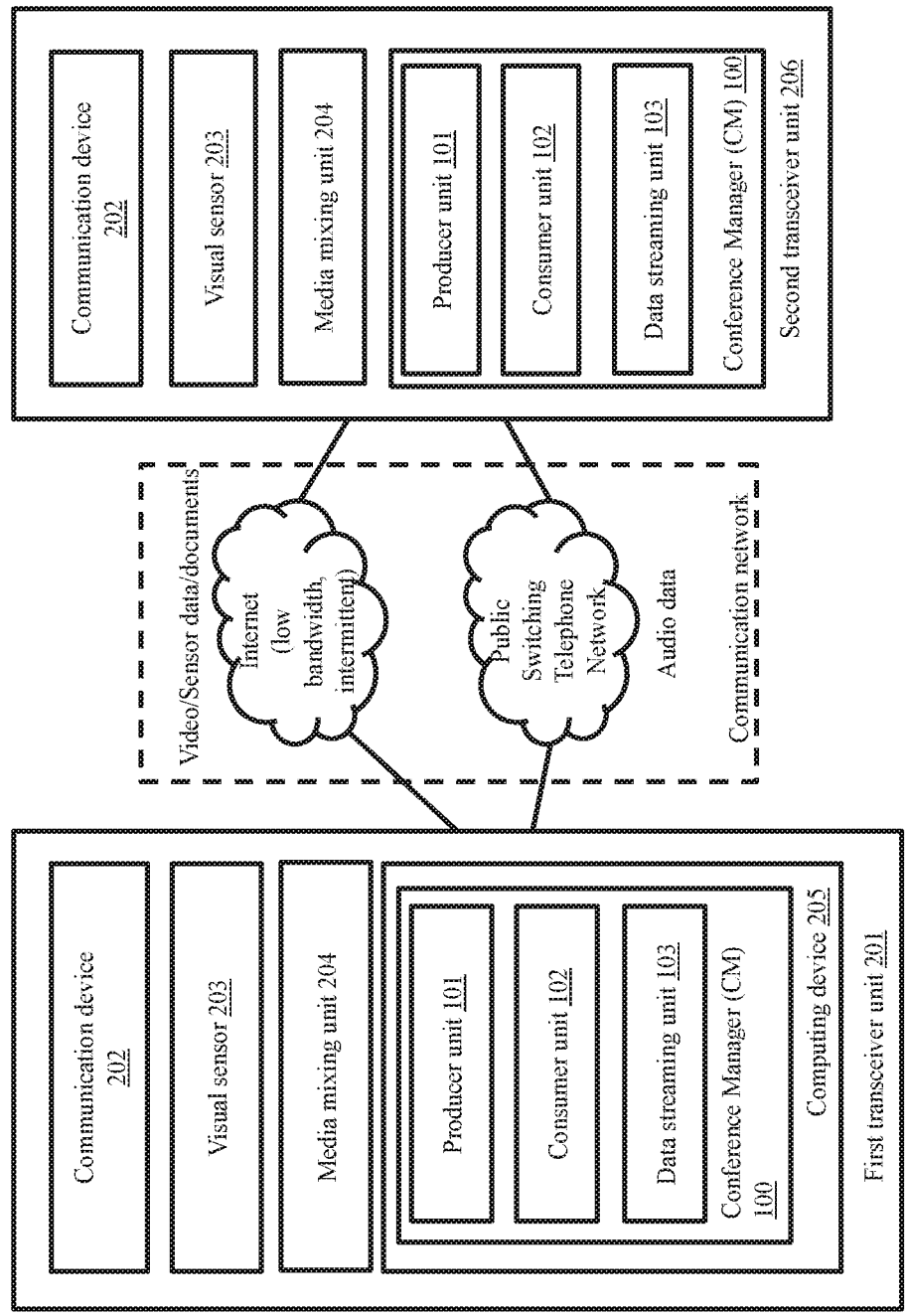
FIG. 2 is a functional block diagram depicting use of the CM of FIG. 1 in a conferencing system, in accordance with some embodiments of the present disclosure.

FIG. 2 is a functional block diagram depicting use of the CM in a conferencing system, according to some embodiments of the present disclosure. As can be seen in FIG. 2, two transceiver units i.e. a first transceiver unit 201 and a second transceiver unit 206 are involved in a conference session. In an embodiment, at an instance the first transceiver unit 201 acts as the transmitting unit and the second transceiver unit 206 acts as the receiving unit. In another embodiment, at an instance the second transceiver unit 206 acts as the transmitting unit and the first transceiver unit 201 acts as the receiving unit. In yet another embodiment, both the first transceiver unit 201 and the second transceiver unit 206 act as the transmitting and receiving units in the same conference session (i.e. bi-directional full-duplex communication).

Each of the transceiver units 201 and 206 include a communication device 202, a visual sensor 203, a media mixing unit 204, and a computing device 205. The computing device 205 includes a CM 100.

The communication device 202 may be any appropriate communication device such as a mobile phone, with at least a 2G network connectivity, and which can capture and transmit audio signals corresponding to the conference session to a receiving end. The visual sensor 203 may be a camera that can capture a video corresponding to the conference session. In various embodiments, the visual sensor 203 may be a part of the communication device 202, or may be an independent unit. It is also to be noted that any number of transceiver units can involve/be part of the conference session. For the ease of explanation, only two transceiver units are considered in this embodiment, as depicted in FIG. 2.

Figure 8:
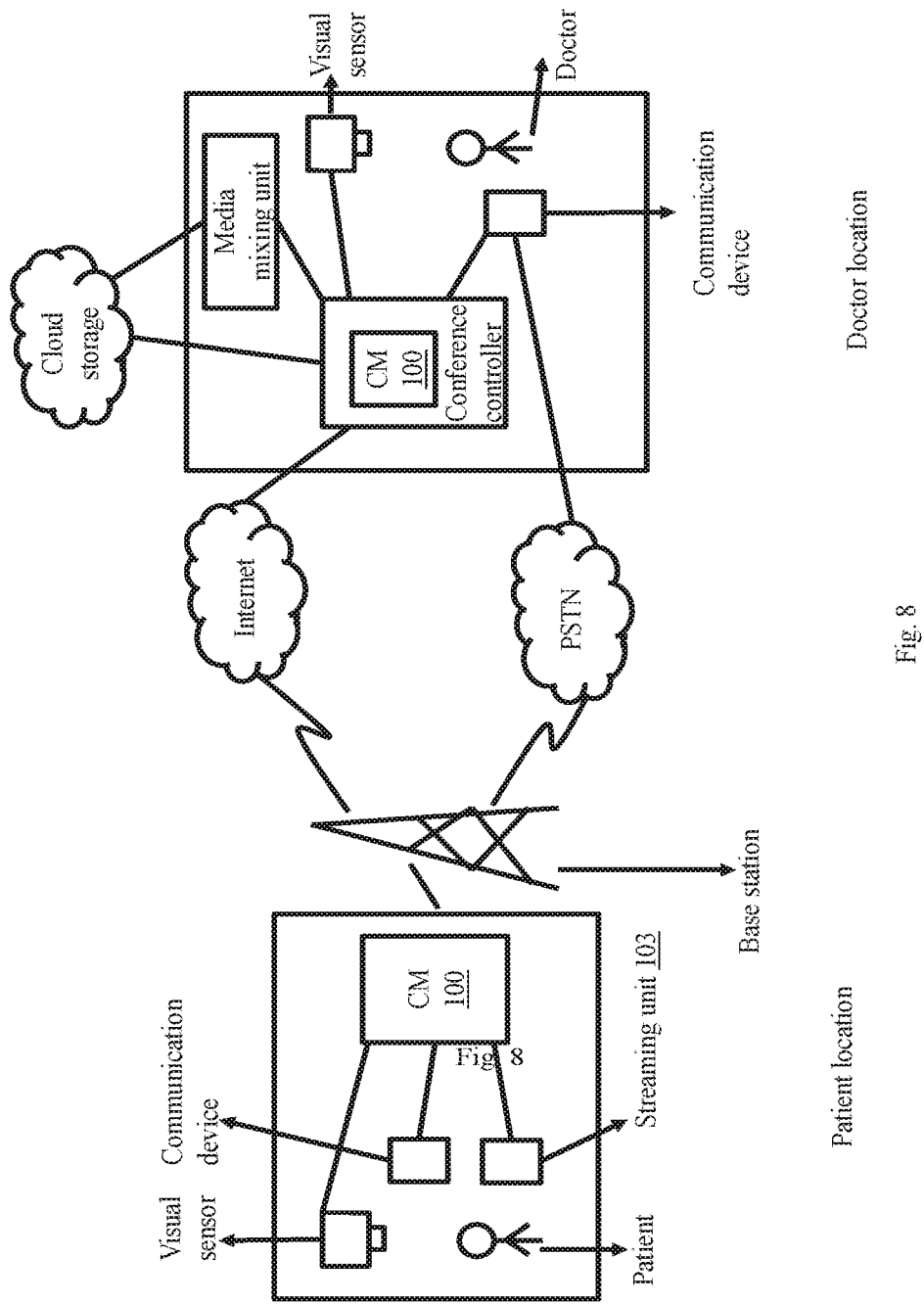
FIG. 8 is an example diagram depicting implementation of the CM of FIG. 1 in a conferencing system for tele-medicine application, in accordance with some embodiments of the present disclosure.

For ease of understanding, consider a video-conference surgery scenario (as depicted in FIG. 8). Consider that the first transceiver unit 201 is located at a patient location (a first party) and the second transceiver unit 206 is at a doctor's location. The CM 100 at the first transceiver unit 201 initializes the producer unit 101, the consumer unit 102, and the data streaming unit 103 when a conference session is started. The producer unit 101 captures the video of the patient from the patient location using a visual sensor (a camera), corresponding audio is captured by the communication device 202, and any sensor data to be transmitted is captured by the streaming unit 103 from corresponding sensors. The CM 100 at the first transceiver unit transmits the captured video/sensor data/documents if any, over the internet, whereas the audio data is transmitted over a mobile network (PSTN).

The consumer unit 102 at the second transceiver unit 206, which is in the doctor's location (a second party), captures the data transmitted by the first transceiver 201. The captured audio and video data are mixed using the media mixing unit 204. The data which is output of the media mixing unit 204 may be stored in an associated storage space (which may be a cloud based storage system as in FIG. 8). The doctor is then able to view and listen to the contents and the same can be used by the doctor for the purpose of diagnosis. The doctor can then advice the patient or someone else sitting at the patient location over the video conferencing. At this stage the second transceiver unit 206 acts as the transmitting unit and the first transceiver unit 201 acts as the receiving unit. If the doctor requires advice from a specialist doctor, a third transceiver unit (not shown in figure) at the location of the specialist doctor can join the conference session, and the audio/video/sensor data/documents and so on can be exchanged.

Figure 4:
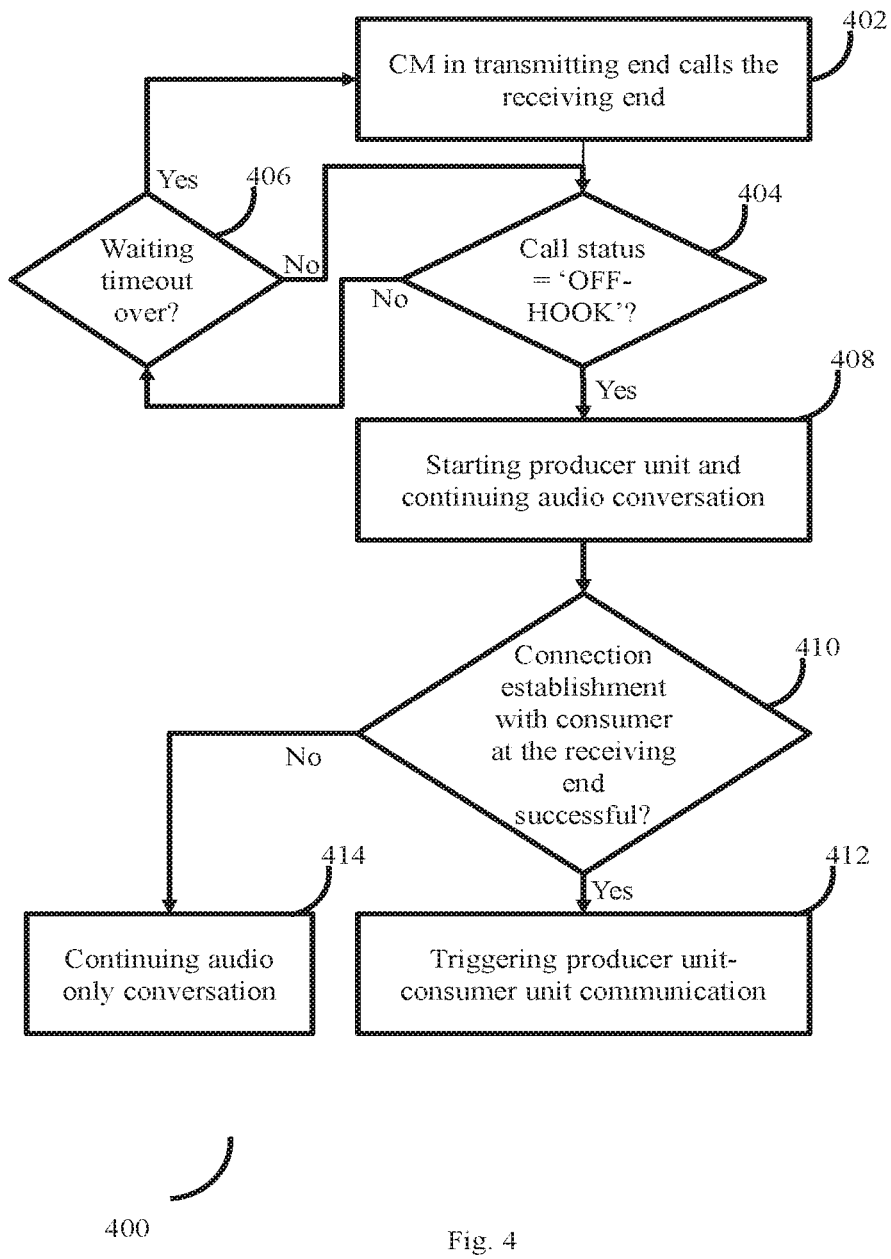
FIG. 4 is a flow diagram depicting steps involved in initiation activities performed by the CM of FIG. 1 at transmitting end, in accordance with some embodiments of the present disclosure.

FIG. 4 is a flow diagram depicting steps involved in initiation activities performed by the CM of FIG. 1 at transmitting end, in accordance with some embodiments of the present disclosure. The CM 100 at the transmitting end calls (402) the receiving end. If the call status is not 'OFF-HOOK', which indicates that the receiving end is not available for communication, then the CM 100 at the transmitting end waits for a specific time period, and if the receiving end is still not available even after expiry of the time period, then the call is reattempted. If the call status is 'OFF-HOOK', which indicates that the receiving end is available for communication, the CM 100 starts/initiates (408) the producer unit 101 at the transmitting end and continues the audio conversation. The producer unit 101 at the transmitting end tries to establish communication with consumer unit 102 at the receiving end. If the connection is successfully established (410), then the CM 100 triggers (412) producer unit 101-consumer unit 102 communication. If the connection is unsuccessful, then the CM 100 enables (414) audio-only communication.

Figure 5:
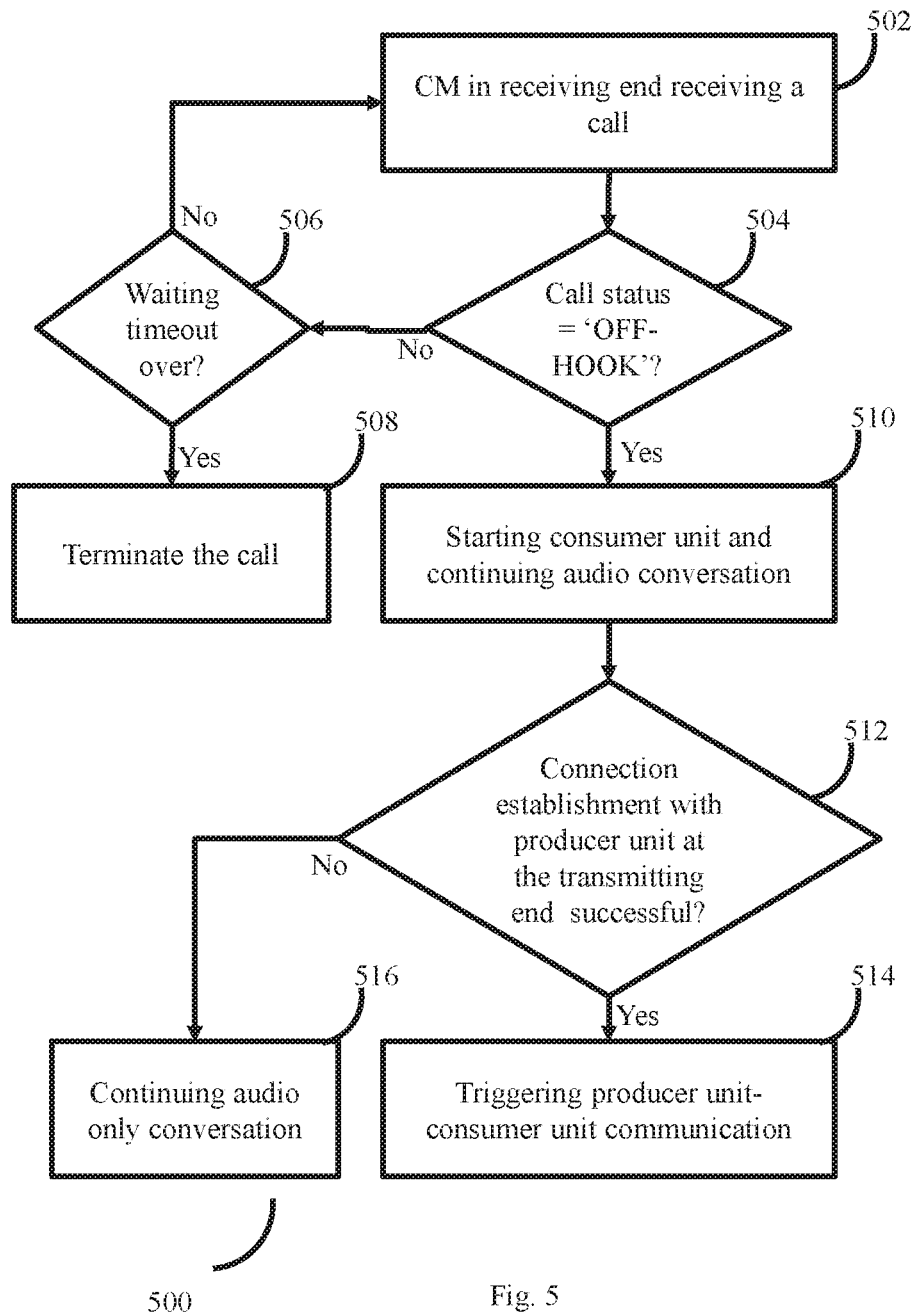
FIG. 5 is a flow diagram depicting steps involved in initiation activities performed by the CM of FIG. 1 at receiving end, in accordance with some embodiments of the present disclosure.

FIG. 5 is a flow diagram depicting steps involved in initiation activities performed by the CM of FIG. 1 at receiving end, in accordance with some embodiments of the present disclosure. The CM 100 at the receiving end receives (502) a call from the transmitting end. If the call status is not 'OFF-HOOK', which indicates that the transmitting end is not available for communication, then the CM 100 at the receiving end waits for a specific time period, and if the receiving end is still not available even after expiry of the time period, then the call is terminated (508). If the receiving end is available for communication (which is indicated by a call status 'OFF-HOOK'), the CM 100 at the receiving end starts/initiates (510) the consumer unit 101 at the receiving end and continues the audio conversation. The consumer unit 102 at the receiving end tries to establish communication with producer unit 101 at the transmitting end. If the connection is successfully established (512), then the CM 100 triggers (514) producer unit 101-consumer unit 101 communication. If the connection is unsuccessful, then the CM 100 enables and continues (516) audio-only communication.

Figure 6A:
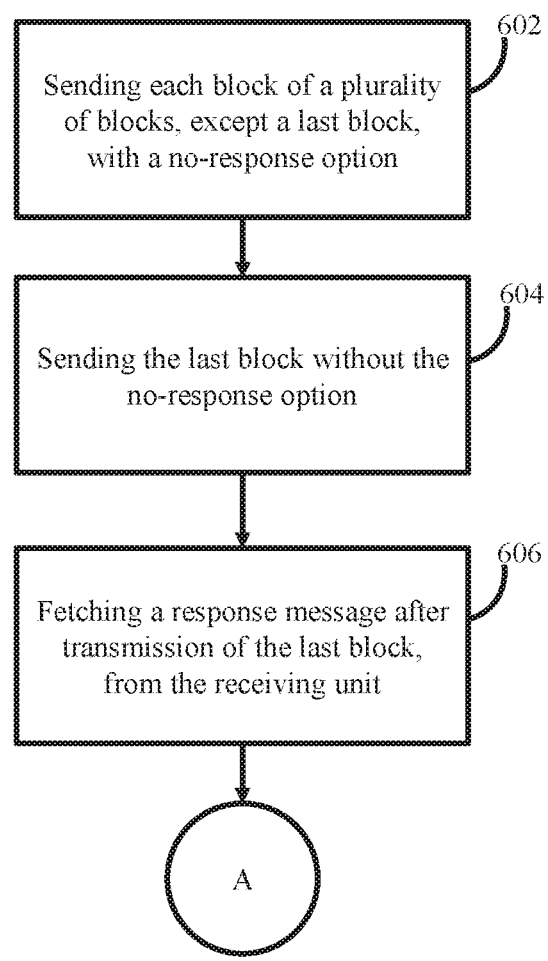
FIGS. 6A, 6B, and 6C (collectively referred to as FIG. 6) illustrate a flow diagram depicting steps involved in the process of fast block-wise transfer being enabled by the CM of FIG. 1, in accordance with some embodiments of the present disclosure.
Figure 6B:
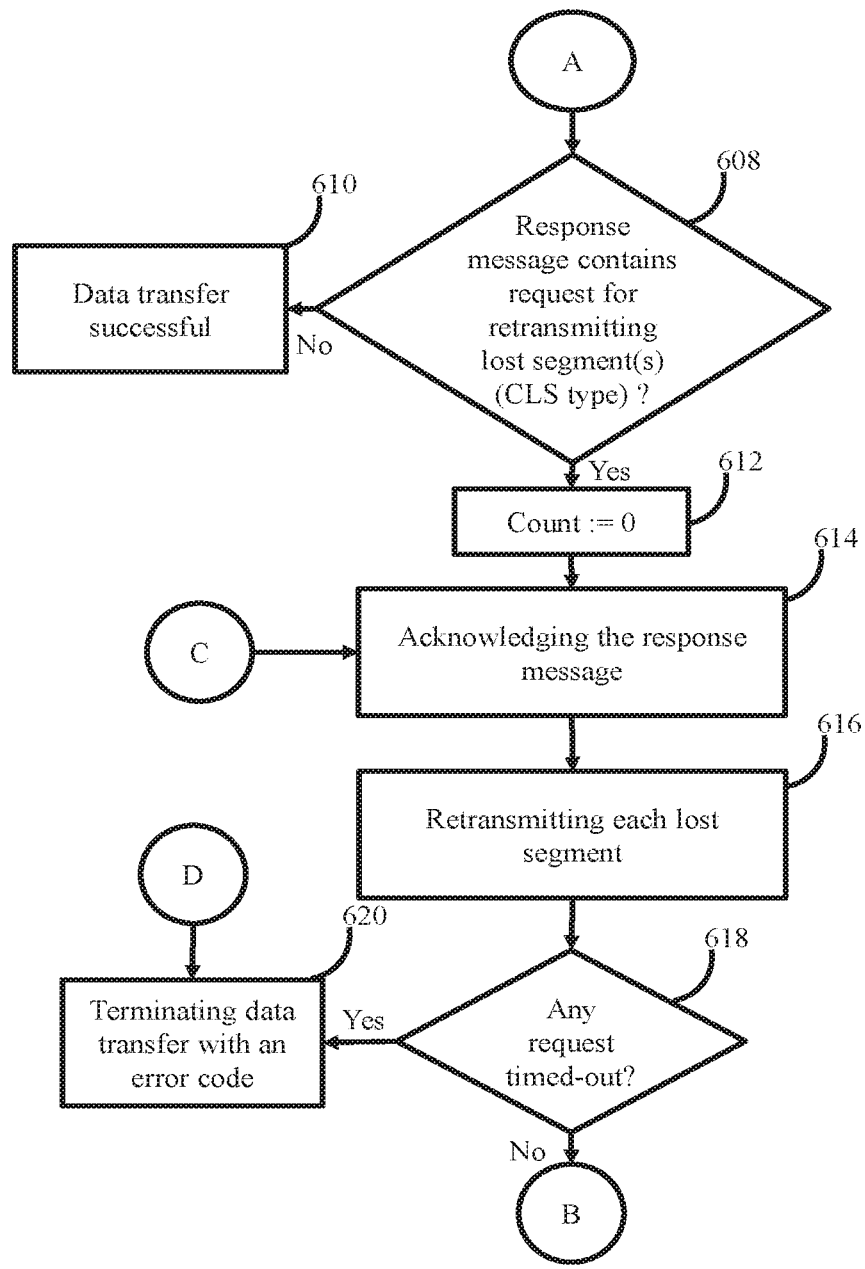
Figure 6C:
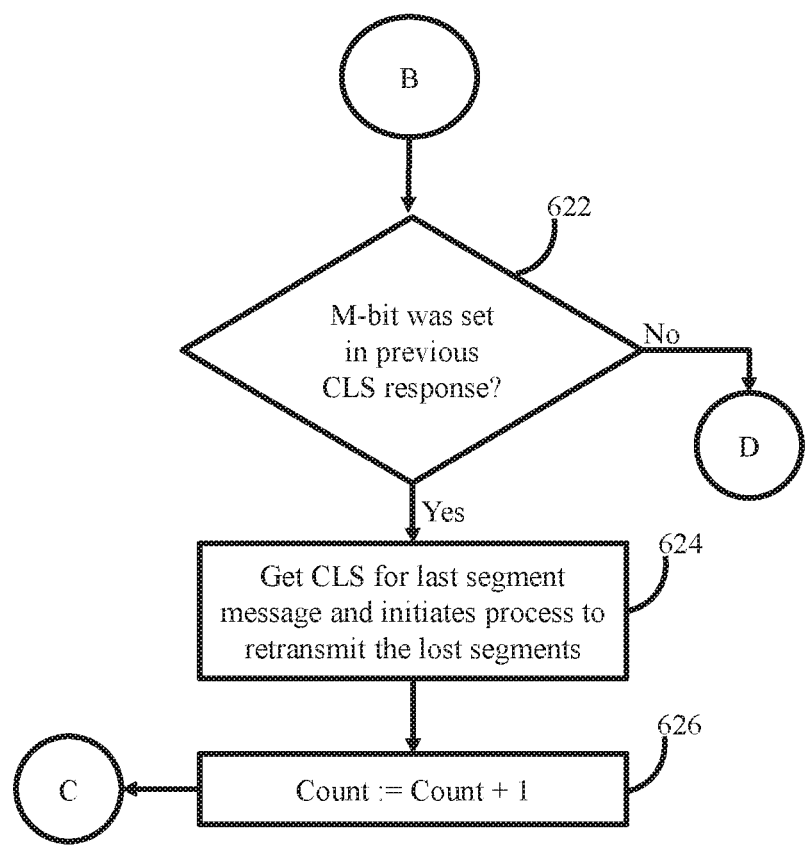

FIG. 6 is a flow diagram depicting steps involved in the process of fast block-wise transfer being enabled by the CM of FIG. 1, in accordance with some embodiments of the present disclosure.

Figure 9:
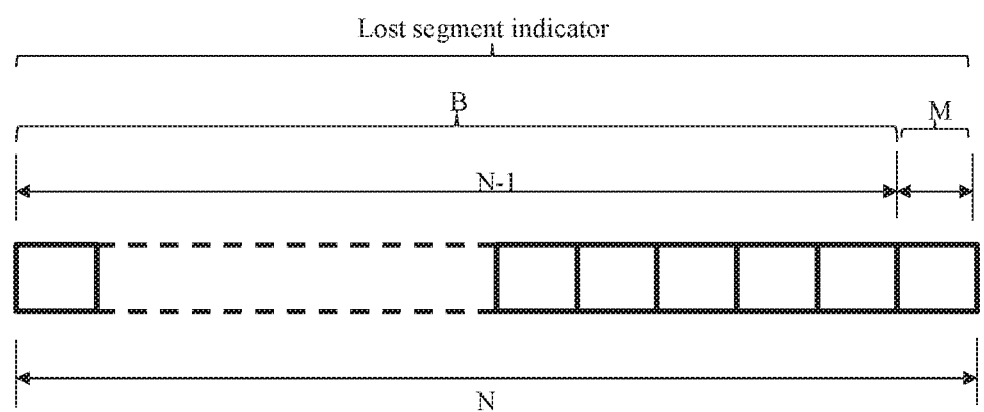
FIG. 9 is an example bit arrangement for lost segment indicator used by the CM of FIG. 1, in accordance with some embodiments of the present disclosure.

In the Fast Block-wise Data (FBD) transfer, each block/segment of a plurality of blocks in a message frame corresponding to data being transmitted from the transmitting end to the receiving end, except last block, are sent as non-confirmable requests with a no-response option on a representational state transfer protocol (STP) over a datagram Transport protocol (DTP). The last block in the message frame corresponding to data being transmitted is sent (604) as a confirmable request without the no-response option. Upon receiving the last block (without the no-response option), the receiving end transmits a response message back to the transmitting end. The transmitting end fetches/collects (606) the response message from the receiving end. If any of the blocks has been lost during transmission, the response message sent by the receiving end is of a type 'Continue for Lost Segments (CLS)'. If the response message does not contain/is not of CLS type message, then the transmitting end marks the data transmission as successful (610). An example bit arrangement for lost segment indicator is depicted in FIG. 9. In the depicted bit arrangement,
N=max message_size
M=more bit
B=lost segment bit-map If the response message indicates loss of at least one of the blocks transmitted (i.e. the response message contains CLS type), then the transmitting end acknowledges (614) the response message, and identifies position of the at least one block in the message frame and retransmits the at least one block/each of the lost segments. Further the block which has been identified as missing/lost is retransmitted by the transmitting end. If any request is timed-out, then the transmitting end terminates (620) the data transfer with a suitable error code.

After retransmitting all the lost blocks, the transmitting end awaits another response message from the receiving end, and upon receipt of the response message, checks if M-bit is set (which indicates lost blocks). If the response message indicates loss of any block/segment, then the transmitting re-iterates steps 614-624. The data transfer is terminated if the response message indicates that all blocks have been received. Here, since the response message is sent by the receiving end only after receiving the last block (and not separately for each of the blocks received), amount of load on the network is less.

The mechanism of communication disclosed in the Indian patent application number 201821005659 allows data transmission on a low bandwidth network. The CM 100 integrates and controls working of the producer unit and the consumer unit at a transmitting and at a receiving end of a communication network so as to facilitate the bi-directional video conferencing.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A Conference Manager (CM), comprising:
a producer unit;
a consumer unit; and
a data streaming unit;
wherein the CM is configured to handle bi-directional communication between a transmitting end and a receiving end of a communication network the CM is associated with, comprising:
  at the transmitting end of the communication network:
    initiating a communication device and a visual sensor at the transmitting end when a conference session is initiated, by the producer unit;
    initiating capturing of an audio signal and a video using the communication device and the visual sensor, by the producer unit;
    transmitting the audio signal over a circuit switched connection and the video over a packet switched connection, wherein the video transmission over the packet switched connection is initiated only if audio communication over the circuit switched connection between the transmitting end and the receiving end is successful; and
    facilitating only the audio communication between the transmitting end and the receiving end over the circuit switched connection, using the responsive to the request to perform the server-related processing task, terminating the data transfer if the response message indicates that all blocks have been received.

2. A conferencing system, comprising:
a first transceiver unit;
a communication network; and
a second transceiver unit;
the first transceiver unit comprising:
  a communication device, wherein the communication device captures and transmits a first audio signal from location of the first transceiver unit to the second transceiver unit, and receives a second audio signal from the second transceiver unit, over a circuit switched connection;
  a visual sensor, wherein the visual sensor is configured to capture a video of at least one subject which is at the location of the first transceiver unit, further wherein the video is transmitted to the second transceiver unit, over a packet switched connection;
  a computing device, comprising:
    a Conference Manager (CM), comprising:
      a producer unit, wherein the producer unit is configured to:
        initiate the communication device and the visual sensor when a conference session is initiated;
      communication device, if the packet switched connection between the transmitting end and the receiving end is unsuccessful;
    at the receiving end of the communication network:

initiating reception of the audio signal and the video from the transmitting end, during the conference session, using the consumer unit; and enabling fast block-wise transfer of data transmitted between the transmitting end and the receiving end, other than the audio signal and the video, related to the conference session, if size of the data exceeds a Maximum Transfer Unit (MTU) size of the communication network, wherein the fast block-wise transfer of data between the transmitting end and the receiving end is enabled by:

sending all blocks except last block in a message frame corresponding to data being transmitted, as a non-confirmable request with a no-response option on a representational state transfer protocol (STP) over a datagram Transport protocol (DTP);

sending the last block in the message frame corresponding to data being transmitted, as a confirmable request without the no-response option;

fetching a response message corresponding to the blocks transmitted, after transmitting the last block;

if the response message is of Continue for Lost Segments (CLS) type comprising a lost block indicator, then:

identifying position of at least one block in the message frame, wherein the lost block indicator includes a lost block bit-map; and retransmitting the at least one block; and initiate capturing of the first audio signal and the video, wherein the video transmission over the packet switched connection is initiated only if audio communication over the circuit switched connection between the first transceiver unit and the second transceiver unit is successful; and facilitate only the audio communication between the first transceiver unit and the second transceiver unit over the circuit switched connection, using the communication device, if the packet switched connection between the first transceiver unit and the second transceiver unit is unsuccessful;

a consumer unit, wherein the consumer unit is configured to:

initiate reception of at least one of the second audio signal and a video from the second transceiver unit, during the conference session, wherein reception of the video from the second transceiver unit is over the packet switched network; and a data streaming unit, wherein the data streaming unit enables fast block-wise transfer of data over the communication network, other than audio signal and the video, related to the conference if size of data exceeds a Maximum Transfer Unit (MTU) size of the communication network, wherein the fast block-wise transfer of data between the transmitting end and the receiving end is enabled by:

sending all blocks except last block in a message frame corresponding to data being transmitted, as a non-confirmable request with a no-response option on a representational state transfer protocol (STP) over a datagram Transport protocol (DTP);

sending the last block in the message frame corresponding to data being transmitted, as a confirmable request without the no-response option;

fetching a response message corresponding to the blocks transmitted, after transmitting the last block;

if the response message is of Continue for Lost Segments (CLS) type comprising a lost block indicator, then:

identifying position of at least one block in the message frame, wherein the lost block indicator includes a lost block bit-map; and retransmitting the at least one block; and terminating the data transfer if the response message indicates that all blocks have been received;

wherein the CM is configured to coordinate capturing of the first audio signal and the video and transmission of the captured first audio signal and the video to the second transceiver unit; and the second transceiver unit comprising:

the Conference Manager (CM), comprising:

the producer unit; and the consumer unit;

wherein the CM is configured to collect and download the first audio signal and the video transmitted by the first transceiver unit.

\* \* \* \* \*